United States Patent [11] 3,628,750

[72] Inventors Herman H. Waggershauser; Joseph L. Boon, both of Rochester; John J. Bundschuh, Penfield, all of N.Y.
[21] Appl. No. 873,478
[22] Filed Nov. 3, 1969
[45] Patented Dec. 21, 1971
[73] Assignee Eastman Kodak Company Rochester, N.Y.
Continuation of application Ser. No. 692,994, Dec. 22, 1967, now abandoned. This application Nov. 3, 1969, Ser. No. 873,478

[54] APPARATUS FOR MONITORING REWIND IN A MOTION PICTURE PROJECTOR
8 Claims, 8 Drawing Figs.

[52] U.S. Cl. 242/186, 352/180
[51] Int. Cl. B65h 59/38, G03b 1/04, G11b 15/32
[50] Field of Search 242/186, 187, 196, 67.5; 352/180

[56] References Cited

UNITED STATES PATENTS 2,991,950 7/1961 Axon et al. 242/187
3,102,699 9/1963 Proctor 242/187

*Primary Examiner*—Leonard D. Christian
*Attorneys*—Robert W. Hampton and G. Herman Childress

ABSTRACT: A cartridge-loading motion picture projector is provided with a movable arm for supporting a reel within a cartridge which in turn is supported on the projector. The arm is arranged to assume an angular position dependent on the size of the cartridge. Means are provided for sensing a code indication on the cartridge and means are provided for sensing the amount of film wound on the reel within the cartridge. A comparing means is responsive to the variables sensed by the two sensing means for adjusting the rotational speed of the supply reel during rewind.

HERMAN H. WAGGERSHAUSER
JOSEPH L. BOON
JOHN J. BUNDSCHUH
INVENTORS

BY [signature] [signature]
ATTORNEYS

HERMAN H. WAGGERSHAUSER
JOSEPH L. BOON
JOHN J. BUNDSCHUH
INVENTORS

BY James A Smith
Robert W Hampton

ATTORNEYS

HERMAN H. WAGGERSHAUSER
JOSEPH L. BOON
JOHN J. BUNDSCHUH
INVENTORS

BY James A. Smith
Robert W. Hampton

ATTORNEYS

HERMAN H. WAGGERSHAUSER
JOSEPH L. BOON
JOHN J. BUNDSCHUH
INVENTORS,

BY James A. Smith
Robert W. Hampton

ATTORNEYS

APPARATUS FOR MONITORING REWIND IN A MOTION PICTURE PROJECTOR

This application is a continuation of our application Ser. No. 692,994, filed Dec. 22, 1967 and now abandoned.

CROSS-REFERENCES TO RELATED APPLICATIONS

Reference is made to commonly assigned U.S. Pat. application Ser. No. 643,502, entitled CINEMATOGRAPHIC CARTRIDGE PROJECTOR APPARATUS, filed in the name of Bundschuh et al. on June 5, 1969; Ser. No. 470,499, entitled AUTOMATIC FILM STRIPPER, filed in the name of McKee on July 8, 1965, now U.S. Pat. No. 3,429,518; Ser. No. 643,503, entitled CARTRIDGE FOR REEL OF STRIP MATERIAL, filed in the name of Bundschuh on June 5, 1967; Ser. No. 685,588, entitled CARTRIDGE, filed in the name of Bundschuh on Nov. 24, 1967, and refiled as a continuation-in-part application Ser. No. 736,524 on May 23, 1968; Ser. No. 685,616, entitled CINEMATOGRAPHIC PROJECTORS OR THE LIKE AND CARTRIDGES FOR USE THEREWITH, filed in the name of Bundschuh et al. on Nov. 24, 1967; and Ser. No. 692,814, entitled APPARATUS FOR MONITORING REWIND IN A MOTION PICTURE PROJECTOR, filed in the name of Bundschuh on Dec. 22, 1967.

BACKGROUND OF THE INVENTION

The present invention relates to rewinding apparatus, and more specifically to apparatus for monitoring the operation of an automatic rewind mechanism for a motion picture projector or the like.

To simplify the use of motion picture projectors or the like, considerable attention has been directed toward providing means whereby such apparatus can be loaded with a cartridge containing a reel from which the film can be removed, threaded, projected, and then rewound automatically.

Such a cartridge-loading projector apparatus is disclosed in commonly assigned copending U.S. Pat. application Ser. No. 685,616, entitled CINEMATOGRAPHIC PROJECTORS OR THE LIKE AND CARTRIDGES FOR USE THEREWITH, filed by John J. Bundschuh et al. on Nov. 24, 1967. In the apparatus disclosed in this application, a film reel is positioned within a cartridge having an opening adapted to receive a spindle which rotatably supports and drives the reel within the cartridge.

With the cartridge positioned on the projector, the film roll is radially accessible to a stripping mechanism which is movable into temporary operative relationship with the film roll on the reel through another cartridge opening; such mechanism being adapted to separate the leading end of the film from the roll and to feed it along a predetermined threading path. Upon completion of the projection cycle, a rewind mechanism initiates a rewind cycle whereupon the gate is opened, the pulldown claw is retracted, and the film is rapidly rewound onto the supply spool.

Further details and features of the aforementioned film stripping and threading mechanism and of film supply cartridges adapted for use therewith are disclosed in related U.S. application Ser. No. 643,502, entitled CINEMATOGRAPHIC CARTRIDGE PROJECTOR APPARATUS, filed by John J. Bundschuh et al. on June 5, 1967; U.S. application Ser. No. 470,499, entitled AUTOMATIC FILM STRIPPER, filed by Edward S. McKee on July 8, 1965, now U.S. Pat. 3,429,518; and U.S. application Ser. No. 643,503, entitled CARTRIDGE FOR REEL OF STRIP MATERIAL, filed by John J. Bundschuh et al. on June 5, 1967.

While the projector mechanisms disclosed in the above applications achieve their intended purpose, the rewind feature is subject to certain limitations when reels and/or cartridges of different size are used. During rewinding of the film onto the supply reel, the linear velocity of the film is dependent upon the effective diameter of the film on the supply reel. Thus, if the rewind feature is designed with relatively short lengths of film in mind (e.g., 50 feet) the larger effective diameter and high velocity of film when a larger length is used (e.g., 400 feet) makes it difficult to rewind film through the open gate. On the other hand, if the projector should be designed with the relatively larger film length and larger reel size in mind, rewinding of shorter lengths would be too slow.

SUMMARY OF THE INVENTION

The principal object of the present invention is to provide an improved automatic rewind apparatus or mechanism for a motion picture projector wherein the rotational speed of the supply reel during rewind is varied according to the length of film wound thereon. One embodiment of the invention which is disclosed in connection with a cartridge-loading projector of the general type described in application Ser. No. 685,616, filed on Nov. 24, 1967 by John J. Bundschuh et al. and entitled CINEMATOGRAPHIC PROJECTORS OR THE LIKE AND CARTRIDGES FOR USE THEREWITH, includes means for sensing the amount of film on a film reel or the size of a cartridge mounted on the projector. The rewind speed is adjusted in accordance with the variable sensed by the sensing means so that the angular velocity of the supply reel during rewind is compatible with the effective diameter of the film roll wound thereon.

BRIEF DESCRIPTION OF DRAWINGS

In the drawings:

GENERAL DESCRIPTION 109 As previously mentioned, an automatic threading and rewind projector of the type in which the present 119 may be incorporated, is disclosed in application Ser. No. 685,616, filed on Nov. 24, 1967 by John J. Bundschuh et al. As shown in FIGS. 1, 2, and 3, such a projector comprises a generally rectangular casing 11 including a housing 12 which extends laterally toward the right side of the projector and supports a forwardly facing projection lens assembly 13. Above housing 12, a rotatable takeup reel drive member or shaft 14 extends beyond vertical wall member 15 in coaxial alignment with a corresponding pulley member (not shown), which rotates constantly in a clockwise direction during operation of the projector. Drive member 14 is adapted to receive either a relatively small film takeup reel, as shown at 16 in FIGS. 1 and 2, or a larger takeup reel shown at 17 in broken lines in FIG. 1. A similar rotatable drive member or spindle 18 likewise extends beyond wall member 15 through mechanism plate 19 in coaxial alignment with another pulley member (not shown) which is rotated in a counterclockwise direction during film rewind.

Figure 1:
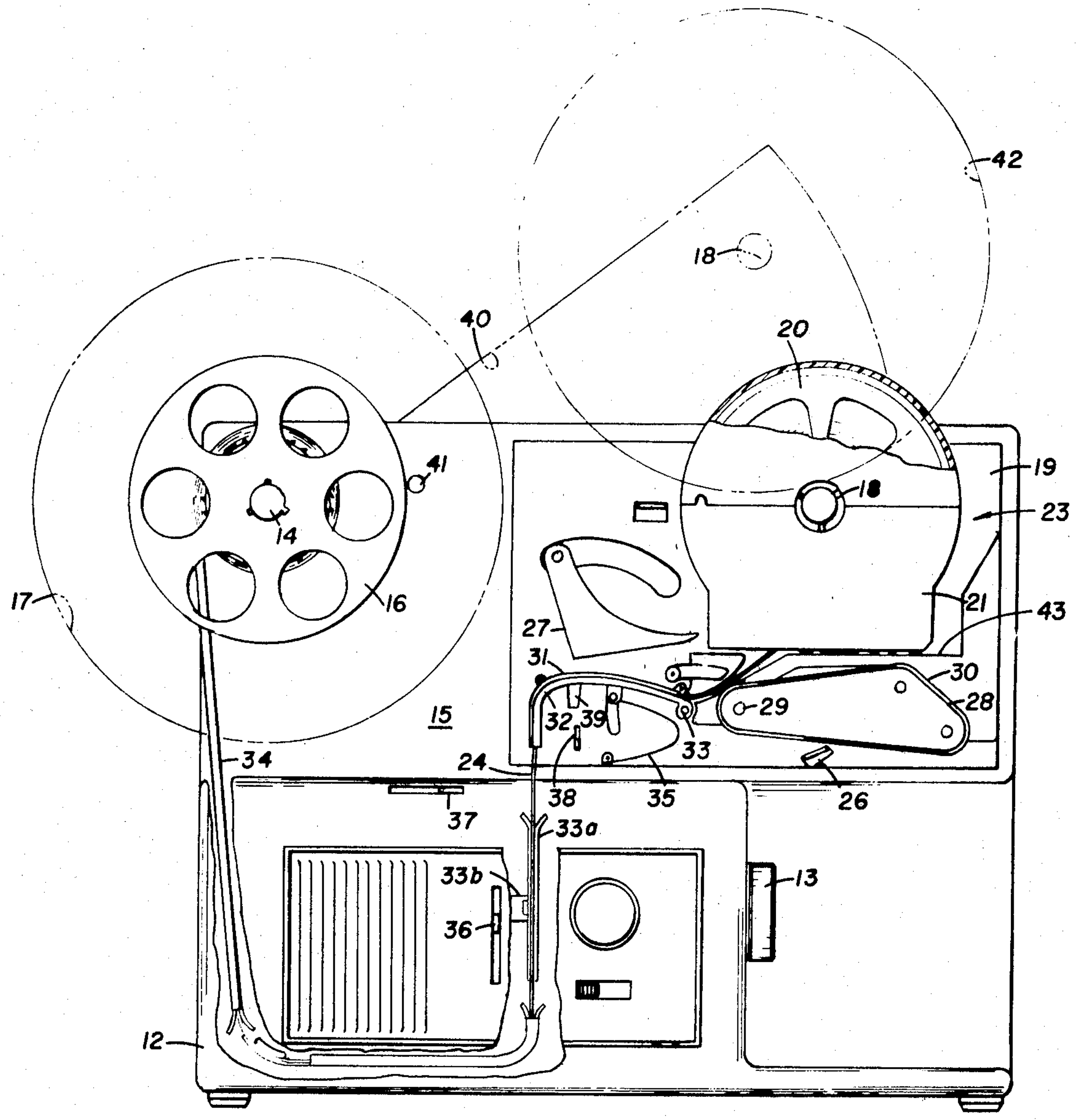
FIG. 1 is an elevational view of the right side of a motion picture projector.
Figures 2, 3:
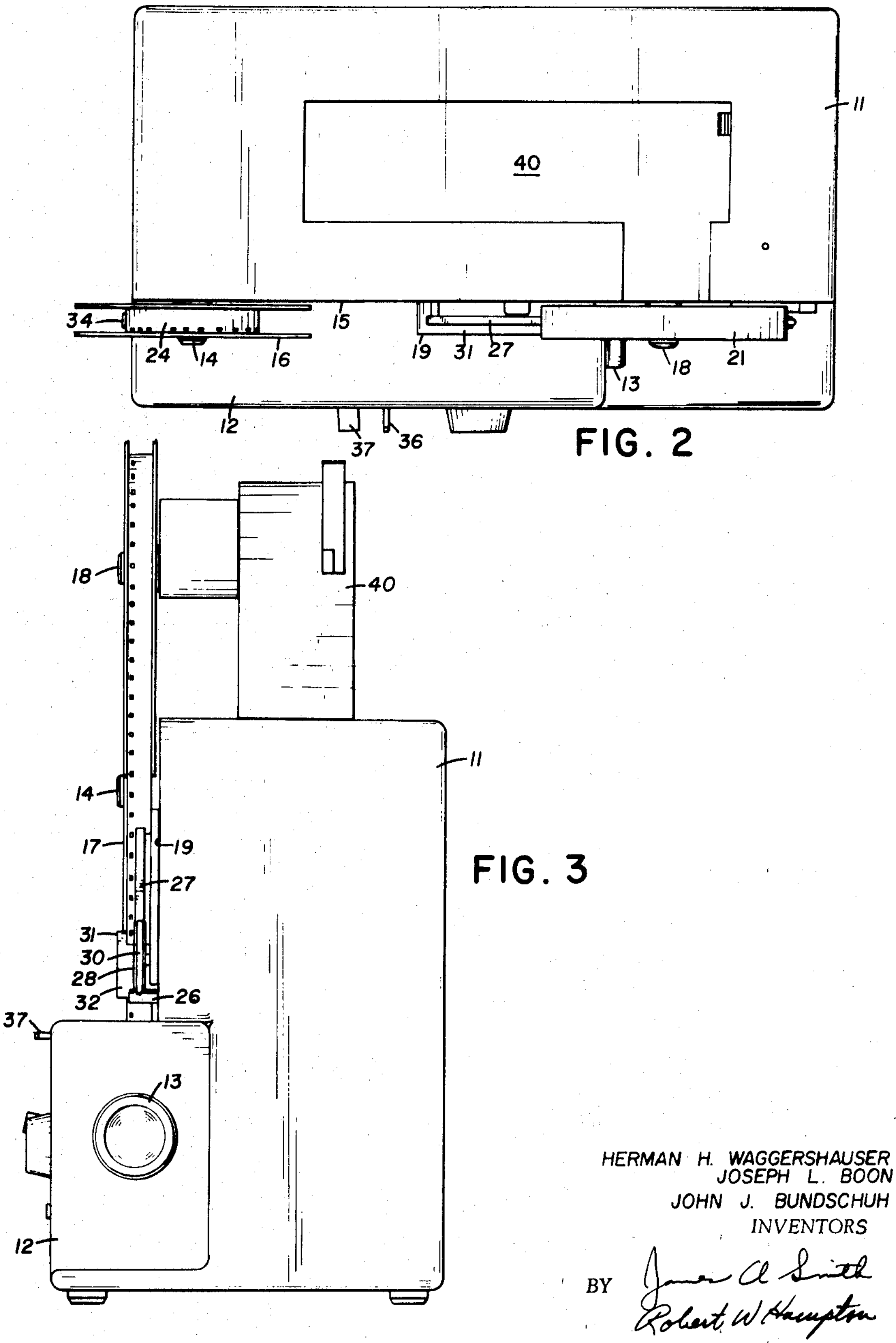
FIG. 2 is a top plan view of the projector shown in FIG. 1.
FIG. 3 is a front elevational view of the projector illustrated in FIGS. 1 and 2

Reel drive member 18 is adapted to receive the hub portion of a film supply reel 20 housed within a cartridge 21 loaded onto the projector as shown at 23. To accommodate the film 24 supplied by such a cartridge, the film takeup reel 16 can be of a size generally equivalent to the size of the cartridge as shown in FIG. 1 or may be of smaller or larger size if desired.

As disclosed in copending application Ser. No. 685,616, the film cartridge 21 may be releasably latched in place on the projector with the cartridge reel in coaxial driving engagement with drive member 18. To remove film from the cartridge, the operator may manually depress an ear 26 to a position in which it is releasably retained by a latch mechanism as described in said copending application. This causes a stripper finger 27 to enter the slotted base portion of the cartridge and thereafter moves a stripper belt assembly 28 in a counterclockwise direction about shaft 29 to bring a moving stripper belt 30 into contact with the periphery of the roll of film on the film supply spool. Concurrently, drive member 18 is released from driving connection with the rotating pulley member so that the cartridge film spool can rotate freely.

The stripper belt is constantly driven in a counterclockwise direction. Therefore, its peripheral engagement with the film supply roll rotates the film roll in a clockwise direction. Accordingly, the leading end of the film is separated from the roll by the stripper finger and is delivered out of the cartridge through a narrow guide path defined between a portion of the stripper belt and an adjacent edge of the stripper finger.

As the leading end of the film emerges beyond the path defined between the stripper belt and the stripper finger, it enters a curved guide channel established between a stationary film guide member 31 and a movable snubber member 32, the latter being pivotable downwardly about pin 33 but biased into resilient engagement with the guide member. This curved guide channel directs the leading end of the film downwardly into the projection gate 33*a* and where it is engaged by the film advancing mechanism 33*b* of the projector, and then advanced intermittently past a projection position in the gate aligned with the projector optical system. Beyond the film gate 33*a*, the leading end of the film proceeds into a pivotally supported channel member 34 which delivers it into contact with the hub of takeup reel 16. As is well known in the projector art, the hub of the takeup reel may be provided with a plurality of teeth adapted to engage the edge perforations in the film, whereby the film is automatically attached to the hub upon being brought into contact therewith.

When the film has been engaged by the film-advancing mechanism, its presence at a predetermined location is detected by an appropriate sensing device which then allows ear 26 to return to its initial position, thereby initiating the projection phase of the operating cycle. This causes the stripper finger and the stripper belt members to retract from the cartridge to their respective positions shown in FIG. 1.

As the film is being projected, it can be stopped and displayed in reverse by manually moving control lever 36 from its illustrated raised (forward) position to an extreme downward (reverse) position. Additionally, the projector is provided with a review mechanism by means of which the operator can rewind and then reproject any desired portion of the film by manually moving control lever 37 to a rearward position to temporarily actuate the film rewinding mechanism.

Considering now the rewind feature in more detail, the inner end of the roll of film 24 on the film supply reel within the cartridge is attached to the core of the spool. Therefore, when all of the available film has been unwound from the cartridge, the resulting tightening of the film between the gate and the spool causes the snubber member 32 to pivot downwardly to a position in which trigger lever 38 is engaged and depressed by shoe member 39 on the snubber member. Such depression of the trigger member initiates the rewind phase of the projectors operating cycle by opening the gate and withdrawing the film pulldown claw therefrom, by reestablishing positive rewinding rotation of drive member 18, and by releasing drive member 14 from the corresponding pulley member to allow the takeup reel to rotate freely as film is unwound therefrom. Thus, the film is automatically rewound entirely into the cartridge through the film gate, whereupon the rewound cartridge can be removed from the projector.

As further disclosed in application Ser. No. 685,616, the spindle 18 may be rotatably supported on a movable arm 40 which is pivotally mounted on the projector housing by a pivot shaft 41. The arm 40 is pivotal between the lower position shown in solid lines in FIG. 1 and the upper position shown in broken lines in FIG. 1, the exact angular orientation of the arm 40 in the lower position being dependent on the size of the cartridge 21 as will later be described in more detail. In the upper position of the arm 40 indicated by the broken lines in FIG. 1 a reel 42 may be supported or the spindle 18 and threading accomplished manually in the manner described in copending application Ser. No. 685,616. Suitable coupling means described in detail in said copending application may be provided to couple the spindle 18 to a drive means within the projector housing.

As shown in FIG. 1, the projector casing 11 is provided with an elongated supporting surface 43 adapted to be engaged by the base surface of the cartridge 21 when the latter is mounted on the projector. To insert the cartridge, the reel 20 is first positioned on the end of the spindle 18 whereupon the assembly comprising movable arm 40, cartridge 21 and reel 16 are positioned downwardly by pivotal displacement of arm 40 until the base surface of the cartridge 21 engages surface 43.

Figures 4, 8:
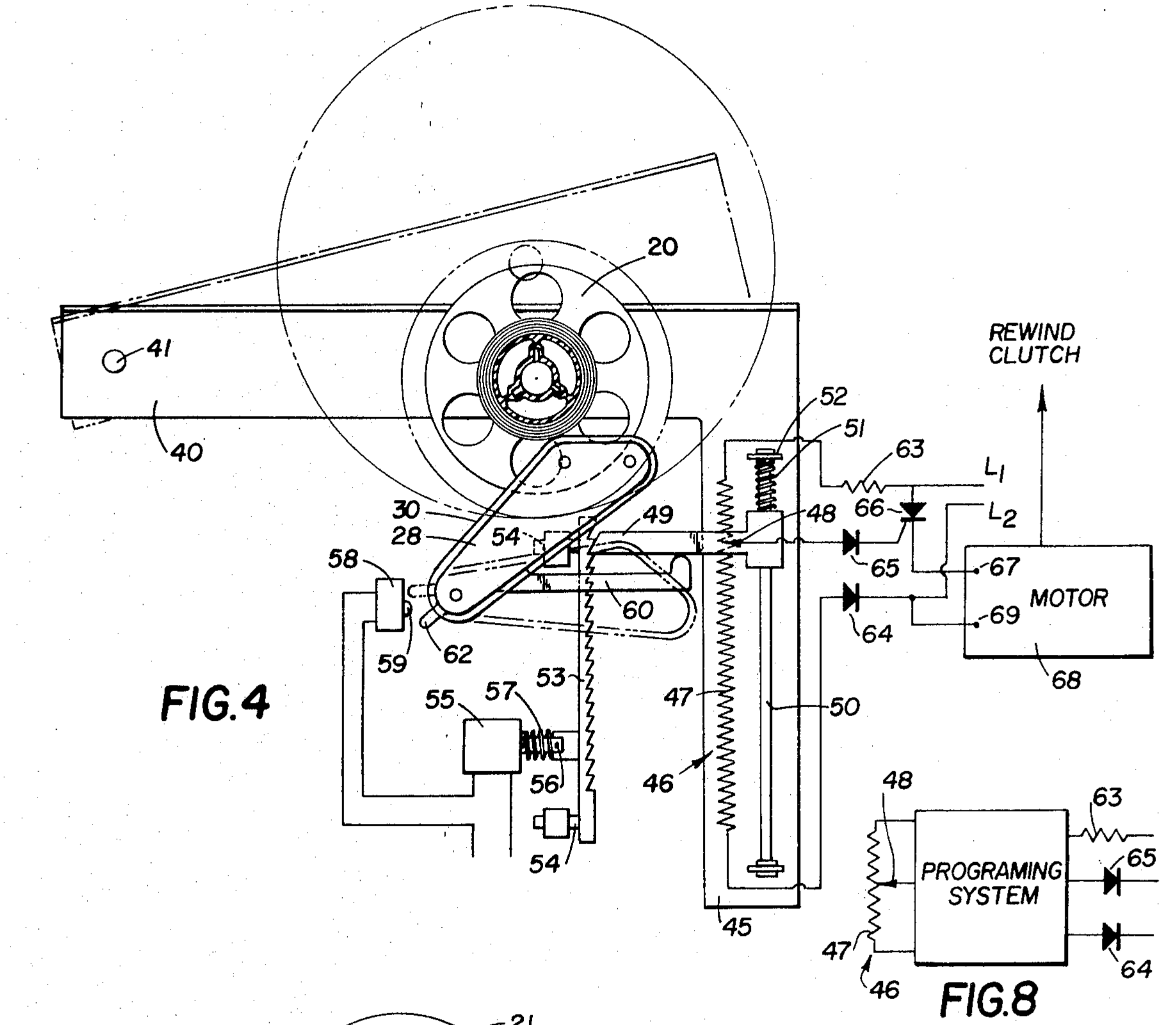
FIG. 4 is a schematic illustration of apparatus for adjusting film rewind speed in a motion picture projector in accordance with the invention.
FIG. 8 is a schematic view illustrating an optional feature.

As shown in FIG. 4, the lowermost angular position of the arm 40 will vary with different reel diameters corresponding to different sizes of cartridges as a result of the variation in spacing between the sidewall opening for receiving the spindle and the base surface of such different size cartridges. In addition, the horizontal position of the cartridge base will vary slightly relative to the surface 43 for cartridges of different sizes since the spindle 18 assumes various positions along an arcuate path to accommodate cartridges of different sizes. Preferably, the surface 43 is sufficiently elongated to accommodate the bases of cartridges of a number of different sizes, e.g., cartridges for containing 50, 100, 200 and 400 foot reels.

It will be apparent to those skilled in the art that a suitable clamping or latching means such as the type disclosed in copending application Ser. No. 685,616, may be provided to rigidly retain the cartridge 21 in engagement with surface 43 to establish a fixed position thereof relative to the projector housing. Since the present disclosure is primarily concerned with the arrangement of surface 43 relative to arm 40 to render the projector suitable for use with cartridges having base portions of different sizes, a specific disclosure of such clamping or latching means is deemed unnecessary.

Considering now the rewind feature, it will be apparent that if during the rewind mode of operation the supply reel 20 is driven by the spindle 18 at a constant angular velocity, the film will move through the projection gate 33*a* at a velocity dependent on the effective diameter of the film roll on the supply spool. It will be further apparent that if the roll has a relatively small effective diameter the linear film velocity will be relatively low. On the other hand, if the film roll has a relatively large effective diameter, the linear film velocity will be relatively high. A similar relationship will exist with respect to large and small film reels filled to capacity, e.g., 50 and 400 foot reels. As a result, the linear velocity of the film during rewind can vary widely with different sizes of reels and with reels containing different lengths of film.

Still referring to FIG. 4, means are provided for adjusting the angular rewind velocity of the spindle and supply reel to provide a film rewind speed compatible to the effective diameter of the film roll on the supply reel. In one embodiment depicted in FIG. 4 a depending extension 45 is formed at the end of arm 40 which provides support for a slidewire resistance identified generally by the reference numeral 46. The slidewire resistance 46 comprises a resistance element 47 cooperative with a contact 48 carried by and movable with a movable arm 49. One end of the arm 49 is slidably mounted on a rod 50 fixedly attached to the extension 45 of arm 40 by suitable means (not shown). A coil spring 51 encircles the rod 50 and is mounted in compression between the arm 49 and a suitable abutment 52 on the upper end of the rod 50 to bias the arm 49 downward as viewed in FIG. 4.

The other end of the arm 49 is provided with a tapered end surface which is adapted to be engaged by a series of ratchet teeth formed on the side surface of a bar 53. The bar 53 may be slidably mounted on a pair of rods 54 suitably supported on the projector housing for movement toward and away from the end of the arm 49 to position the ratchet teeth into and out of engagement therewith. When the bar 53 is in the position shown, the ratchet teeth engage the end of the arm 49 and prevent downward movement of the arm 49 relative to the rod 50 under the bias of the spring 51 while permitting upward movement. If the bar 53 is moved to the left on the rods 54, the ratchet teeth will be positioned out of engagement with the end of the arm 49, and the arm 49 will, accordingly, be free to move under the bias of the spring 51 or to be positioned by the means hereinafter described.

The bar 53 is arranged to be positioned between the aforementioned positions thereof by an electric solenoid 55 which is suitably supported on the projector housing and has an operating plunger 56 operatively connected to the bar 53. A coil spring 57 encircles the plunger 56 and is mounted in compression between the solenoid housing and the bar 53 to thereby bias the bar 53 to the position shown in FIG. 4 wherein the ratchet teeth engage and retain the arm 49.

A momentary make-and-break switch 58 having an actuating button 59 is electrically connected in series with the solenoid 55 across a power source to control energization of the solenoid 55. As will later be described in more detail, when the button 59 is depressed relative to the switch housing, solenoid 55 will become energized to pull the bar 53 to the left as viewed in FIG. 4 to thereby momentarily disengage the ratchet teeth from the end of arm 49. This permits the arm 49 to move under the bias of spring 51.

The actuating button 59 of switch 58 and the arm 49 are both arranged to be actuated or positioned by the belt assembly 28 during a film-stripping operation. As described in more detail in copending application Ser. No. 685,616, the belt assembly has two basic positions, one of which is shown in broken lines and the other of which is shown in solid lines in FIG. 4. When the belt assembly 28 is moved from the position shown in broken lines to that shown in solid lines it enters the cartridge 21 to engage the or film convolution to cause the film to be stripped from the reel and discharged from the cartridge in the manner described in said copending application. Thus, the position of the belt assembly 28 within the cartridge during the film-stripping operation is indicative of the effective diameter of the film roll on a supply reel for a given cartridge size. A portion of the belt assembly 28 is provided with an extending arm 60 having an end portion adapted to engage and position the arm 49 as the assembly 28 is moved from the position shown in broken lines to the position shown in solid lines. A second extending arm 62 is connected to the assembly 28 by a hinge (not shown) whereby the arm 62 will momentarily engage and depress the operating button 59 of switch 58 as the assembly 28 starts to move into the cartridge 23. As a result, switch 58 is momentarily closed to energize solenoid 55 and position bar 53 to the left thereby releasing arm 49 for movement under the influence of spring 51. Arm 49 will thus move downward until it engages extending arm 60 of belt assembly 28. Subsequent movement of the assembly 28 into the cartridge will cause extending arm 60 to position arm 49 upward until the belt assembly engages the film. When the belt assembly 28 is subsequently retracted from the cartridge, the arm 49 will remain in the uppermost position to which it was moved by extending portion 60, the hinge connection of arm 62 being arranged to permit the arm 62 to pivot as it passes button 59 during downward movement of the assembly to prevent reenergization of solenoid 55. Thus, after the belt assembly 28 is removed from the cartridge at the end of the stripping operation the arm 49 and contact 48 will remain in a position indicative of the effective diameter of the film roll on reel 16.

Since fixed resistance 47 is carried by portion 45 of reel arm 40, its position relative to that of contact 48 will depend on the angular position of reel arm 40 and thus the size of the cartridge mounted on the projector. This introduces a compensating effect in the system for errors that would otherwise be introduced by changes in the angular position of the reel arm with cartridges of different size.

Referring now to the electrical circuit, the upper end of the resistance 47 is connected by a resistance 63 to one side $L_1$ of a power source represented by conductors $L_1$ and $L_2$. The other side $L_2$ of the power source is connected through a diode rectifier element 64 to the lower end of the resistance 47. The movable contact 48 is connected through a second diode rectifier element 65 to the control electrode of a silicon-controlled rectifier 66 which has its emitter electrode electrically connected to one side $L_1$ of the power source and has its collector electrode electrically connected to one terminal 67 of a motor 68. The other side $L_2$ of the power source is electrically connected to the other motor terminal 69 to complete the circuit. Preferably the motor 68 in this instance is the variable speed type and may take the form of a commercially available universal type motor. As is well known to those skilled in the art, such motors may be readily controlled to operate at a fixed speed by means of an SCR circuit of the type described above. As diagrammatically indicated in FIG. 4, the shaft of motor 68 may be drivingly coupled to the spindle 18 through the clutch of the rewind mechanism (not shown), which is described in detail in copending application Ser. No. 795,616.

Considering now the operation of the system depicted in FIG. 4, when a cartridge is initially mounted on the projector, the arm 40 and resistance 47 will assume a position indicative of the cartridge size. Subsequently, when the belt assembly 28 is moved into the cartridge to strip the film therefrom, arm 49 will be displaced upward to position contact 48 to a position indicative of the effective film roll diameter. The position of the contact 48 relative to the resistance 47 effectively establishes a set point for the motor speed during the rewind operation which is performed at the end of film projection. The SCR circuit described above will function in a manner well known in the art to maintain this constant motor speed to thereby drive the supply reel 20 at an angular velocity related to the film roll diameter. If desired, the set point can be established to produce the most optimum rewind speed when the reel is half full.

It will be apparent that in practicing the invention a variable speed motor separate from the regular projector motor may be utilized to provide the entire rewind function. Such a motor can be suitably arranged to be drivingly coupled to the spindle 18 by the clutch mechanism disclosed in copending application Ser. No. 685,616. Alternatively, a single variable speed motor could be arranged to drive the projector pulldown mechanism and to provide the rewind function.

Figure 5:
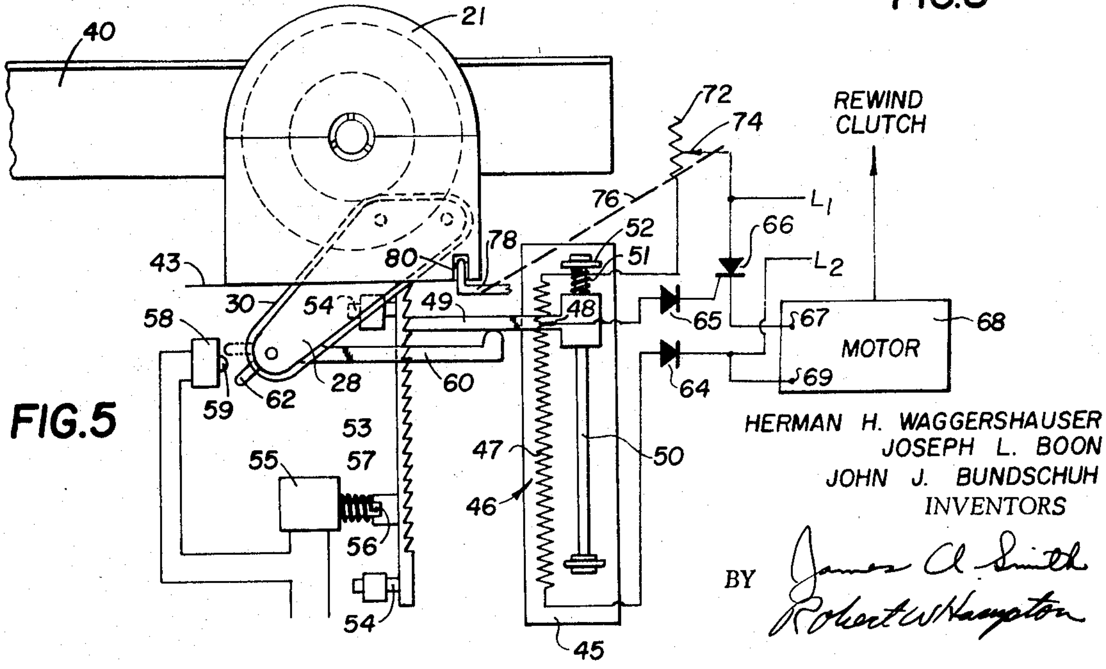
FIG. 5 is a view similar to FIG. 4 illustrating another embodiment of the invention.

Referring to FIG. 5 of the drawings, there is shown another embodiment of the invention wherein parts corresponding to those shown in FIG. 4 have been identified with like reference numerals. In this embodiment the extension of arm 40 is omitted and the fixed resistance 47 is fixedly supported on the projector housing. However, the arm 49 and contact 48 are positioned in the manner disclosed in FIG. 4.

In the FIG. 5 embodiment compensation for different cartridge sizes is accomplished by adjusting the value of a resistance in the SCR circuit. More specifically, the fixed resistance 63 depicted in FIG. 4 is replaced by a slidewire resistance 72 having a movable contact arm 74. The contact arm 74 is arranged to be positioned by a mechanical linkage 76 illustrated schematically and which is coupled to a sensing device 78 adapted to engage a code indication such as the bottom surface of a notch 80 in the base of the cartridge. In the arrangement shown the position of the contact arm 74 will thus be related to the depth of the notch 80. It will be apparent that by providing different size cartridges with notches of different depths, the position of the contact arm 74 will be indicative of the cartridge size. Except for the manner of deriving an indication representative of cartridge and reel size, the system depicted in FIG. 5 will function similar to that shown in FIG. 4.

Figure 6:
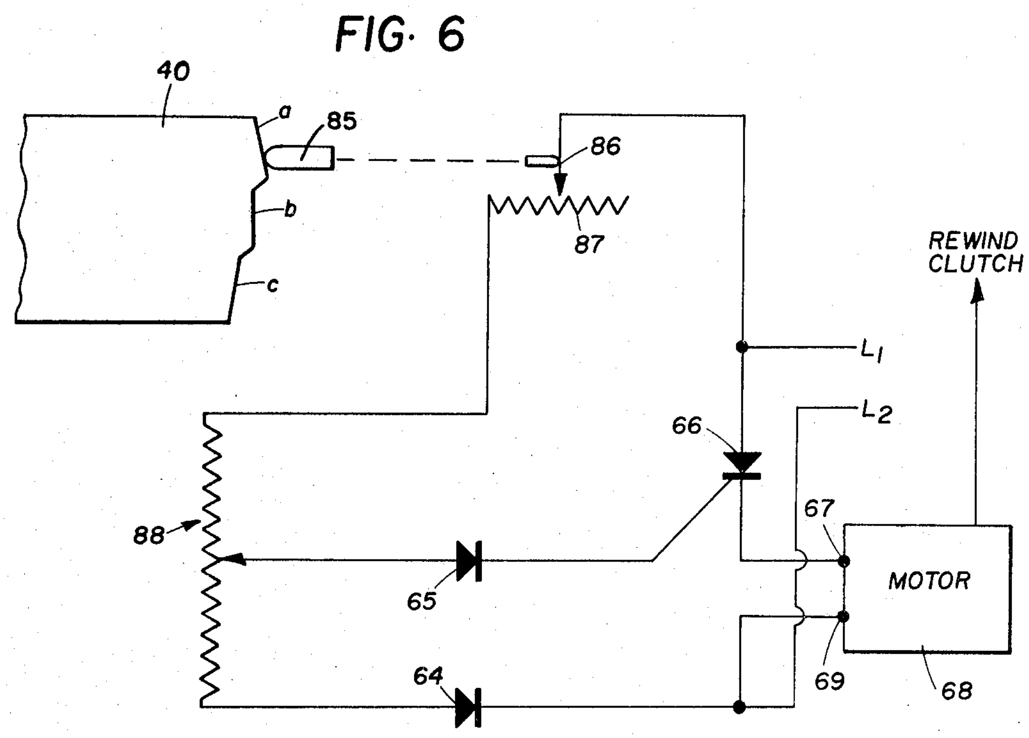
FIG. 6 is a schematic view illustrating still another embodiment of the invention.

Referring to FIG. 6 of the drawing, still another embodiment of a invention is depicted which is particularly suitable for use with cartridges containing full supply reels. In this situation the effective film diameter for a given cartridge size is constant and adjustment of the rewind speed can be limited to that necessary to compensate for the change in reel diameter with cartridge size. More specifically, this can be accomplished as shown by providing the end portion on the reel arm 40 with a series resistance (in this case 3) steps *a*, *b* and *c* which are arranged to be aligned with and position a follower member 85 in the positions of the arm 40 corresponding to, in this case, three different cartridge sizes, respectively. The member 85 may be arranged to position the movable contact 87 of a slidewire resistance 87 to establish three different set point conditions dependent on the angular position of arm 40. The slidewire 87 is connected in an SCR circuit generally similar to the circuit depicted in FIG. 5 except that A manually adjustable slidewire resistance 88 is substituted for the resistance 46. In operation the motor speed during rewind is established by the effective circuit resistance of slidewire 87. In this embodiment, the slidewire resistance 88 may be used as a manual motor control means to manually override the control provided by resistance 87 to determine the motor speed during rewind.

Figure 7:
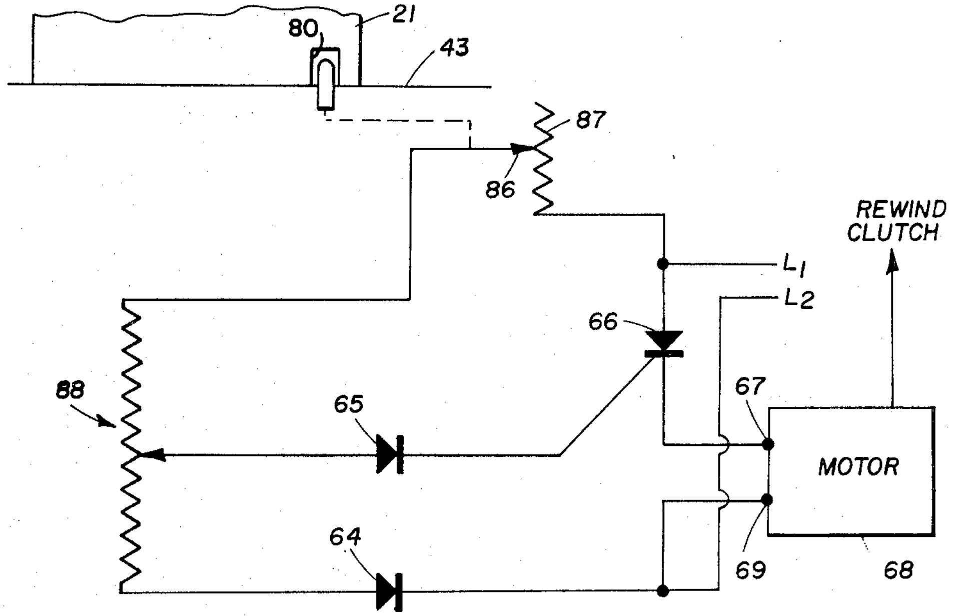
FIG. 7 is a schematic view illustrating still another embodiment of the invention.

Still another embodiment similar to that illustrated in FIG. 6 of the drawings is depicted in FIG. 7 and like parts have been identified with corresponding reference numerals. In this embodiment a notch in the bottom of the cartridge having a depth corresponding to the cartridge size is used to position the contact 86 through a mechanical linkage as diagrammatically indicated. This embodiment thus functions in the same manner as that shown in FIG. 6.

A specific feature which may be utilized in connection with any of the specific embodiments of the invention herein disclosed is illustrated in FIG. 8 of the drawings. This feature is illustrated in connection with the specific circuit shown in FIG. 4 as comprising a programming system or device electrically coupled between the slidewire resistance 46 and the SCR circuit. The specific circuitry of such a system may take various forms well known to those skilled in the art and a specific disclosure is deemed unnecessary. In the system shown, the programming system may be arranged to increase the rewind speed in increments determined, for example, by the output of slidewire resistance 46 during a predetermined time period to incrementally decrease the rewind speed as the film roll on the supply reel increases in diameter. Thus, optimum rewind conditions can be achieved.

It will also be apparent that the various techniques herein disclosed for sensing effective film diameter or cartridge size may be used independently or variously combined to adjust rewind speed.

The invention has been described in detail with particular reference to preferred embodiments thereof, but it will be understood that variations and modifications can be effected within the spirit and scope of the invention as described hereinabove and as defined in the appended claims.

We claim:

1. In a motion picture projector having film projection and film rewind modes of operation, the combination comprising:
- a supply reel adapted to have film wound thereon;
- a projection gate adapted to have film transported therethrough during the projection mode of operation;
- a takeup reel adapted to have film wound thereon;
- means for unwinding film from said supply reel, transporting it through said gate, and then winding it on said takeup reel during the film projection mode of operation;
- means for rapidly unwinding film from said takeup reel, transporting it through said gate, and rewinding it on said supply reel during the rewind mode of operation;
- means for sensing, and for producing an indication of, the effective diameter of the film wound on said supply reel before the film is unwound from the supply reel; and
- means coupled to said sensing means for rotating the supply reel at a speed related to the effective diameter of the film wound on said supply reel during the rewind mode of operation.

2. In a motion picture projector adapted to project film wound on a supply reel contained within a cartridge and having means for rewinding the film on the supply reel by angularly rotating the supply reel during a rewind mode of operation, the combination comprising:
- a movable arm on the projector;
- a drive spindle rotatably mounted on the arm adapted to engage the reel within the cartridge;
- a surface on the projector adapted to be engaged by the cartridge to determine the position of the cartridge, the arm having an angular position dependent on the physical size of the cartridge;
- means for sensing and indicating the position of said arm;
- means for removing film from the cartridge including a member movable into engagement with the film;
- means for sensing and indicating the position of said member when it is in engagement with the film;
- means for comparing the indication produced by both said sensing means to produce a control indication; and
- means responsive to said control indication for determining the angular velocity of the supply reel during the rewind mode of operation.

3. In a motion picture projector adapted to project a film roll wound on a supply reel contained within a cartridge, the projector having means for rotating the supply reel within the cartridge to rewind the film thereon, the combination comprising:
- means engageable with the film on the supply reel prior to projection of the film for producing an indication of the effective diameter of the film roll; and
- means coupled to said indication producing means for adjusting the angular velocity of the supply reel during rewind of film onto the supply reel.

4. In a motion picture projector adapted to project a film roll wound on a supply reel in a cartridge, the projector having means for rotating the supply reel within the cartridge during a rewind mode of operation, the combination comprising:
- means for producing and for retaining an indication of the effective diameter of the film roll within the cartridge prior to projection of the film roll; and
- means responsive to said indication for adjusting the angular velocity of the supply reel during the rewind mode of operation.

5. In a motion picture projector adapted to project a film roll wound on a supply reel contained within a cartridge, a film-feeding mechanism having portions movable into engagement with the film roll within the cartridge for feeding film from the cartridge prior to projecting the film, and the projector having means for rotating the supply reel within the cartridge to rewind the film thereon subsequent to projection of the film roll, the combination comprising:
- control means for determining the angular velocity of the supply reel during rewind of film onto the reel; and
- means coupled to the control means and responsive to engagement between a portion of the film-feeding mechanism and the film roll on the supply reel for adjusting the control means to vary the angular velocity of the supply reel during rewind of film onto said supply reel.

6. In a motion picture projector as set forth in claim 5 wherein said adjusting means comprises an arm movable through a range of positions in response to movement of said portion of said film stripping mechanism into engagement with the film roll on the supply reel, and means for holding said arm in its adjusted position during movement of said portion of said film-feeding mechanism out of engagement with the film roll on the supply reel.

7. In a motion picture projector as set forth in claim 6 wherein said control means comprises an electrical circuit having a slidewire resistance element engageable by a contact for varying the resistance in said circuit, said contact being coupled to said arm for adjusting the resistance in said circuit in response to movement of said arm.

8. In a motion picture projector having means for receiving a supply roll of film, a film takeup, means for advancing film from a received supply roll to said takeup, and rewind means for advancing film from said takeup to a received supply roll at at least two different speeds; the improvement comprising:

sensing means for producing an indication of the effective diameter of a received supply roll before the film is advanced to said takeup; and means coupled to said rewind means and responsive to the indication produced by said sensing means for controlling the speed at which film is advanced from said takeup to the supply roll by said rewind means.

* * * * *